(12) United States Patent
Satran et al.

(10) Patent No.: US 7,240,105 B2
(45) Date of Patent: Jul. 3, 2007

(54) DISTRIBUTED MULTICAST CACHING TECHNIQUE

(75) Inventors: Julian Satran, Atlit (IL); Gidon Gershinsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 09/770,558

(22) Filed: Jan. 26, 2001

(65) Prior Publication Data

US 2002/0103972 A1   Aug. 1, 2002

(51) Int. Cl.
*G06F 15/177* (2006.01)
*H04J 3/26* (2006.01)
*H04L 12/28* (2006.01)
*H04L 12/56* (2006.01)

(52) U.S. Cl. .................... 709/222; 370/390; 370/432
(58) Field of Classification Search ............... 709/201, 709/222; 370/390, 422
See application file for complete search history.

(56) References Cited

U.S. PATENT DOCUMENTS

| | | | |
|---|---|---|---|
| 5,727,002 A | 3/1998 | Miller et al. ................ 371/32 | |
| 6,065,058 A | 5/2000 | Hailpern et al. | |
| 6,507,586 B1* | 1/2003 | Satran et al. ................ 370/432 | |
| 6,684,331 B1* | 1/2004 | Srivastava ................ 713/163 | |
| 6,718,361 B1* | 4/2004 | Basani et al. ................ 709/201 | |
| 6,801,499 B1* | 10/2004 | Anandakumar et al. .... 370/229 | |
| 6,807,578 B2* | 10/2004 | Satran et al. ................ 709/235 | |
| 6,987,728 B2* | 1/2006 | Deshpande ................ 370/229 | |

FOREIGN PATENT DOCUMENTS

| | | |
|---|---|---|
| CA | 2241634 | 12/1998 |
| JP | 10-222411 | 8/1998 |
| JP | 07-239808 | 9/1998 |
| JP | 10-301911 | 11/1998 |
| WO | WO-98/37667 | 8/1998 |

OTHER PUBLICATIONS

Shiroshita, Teruji et al., *Reliable Multicast Transport Protocol (RMTP)*, Draft Document for 37th IETF, Last updated: Feb. 7, 1997, 7 pages.

(Continued)

*Primary Examiner*—David Wiley
*Assistant Examiner*—George C. Neurauter, Jr.
(74) *Attorney, Agent, or Firm*—Darby & Darby

(57) ABSTRACT

A caching arrangement for the content of multicast transmission across a data network utilizes a first cache which receives content from one or more content providers. Using the REMADE protocol, the first cache constructs a group directory. The first cache forms the root of a multilevel hierarchical tree. In accordance with configuration parameters, the first cache transmits the group directory to a plurality of subsidiary caches. The subsidiary caches may reorganize the group directory, and relay it to a lower level of subsidiary caches. The process is recursive, until a multicast group of end-user clients is reached. Requests for content by the end-user clients are received by the lowest level cache, and forwarded as necessary to higher levels in the hierarchy. The content is then returned to the requesters. Various levels of caches retain the group directory and content according to configuration options, which can be adaptive to changing conditions such as demand, loading, and the like. The behavior of the caches may optionally be modified by the policies of the content providers.

39 Claims, 3 Drawing Sheets

OTHER PUBLICATIONS

K. Miller et al., *Starburst Multicast File Transfer Protocol (MFTP) Specification*, Internet Draft, Apr. 1998, 55 pages. (work in progress).

D. Wessels, "Squid Frequently Asked Questions" and "About Squid, This FAQ, and Other Squid Information" ( http://www.squid-cache.org/DOC/FAQ/FAQ(and FAQ-1)).html, 17 pages.

M. Baentsch et al., "World Wide Web Caching: The Application-Level View of the Internet", *IEEE Communications Magazine*, Jun. 1997, pp. 170-178.

N. Smith, "The UK National Web Cache—The State of the Art", *Computer Networks and ISDN Systems* 28, 1996, pp. 1407-1414.

R. Fielding et al., *RFC 2068: Hypernet Transfer Protocol, HTTP/1.1*, Jan. 1997, 162 pages.

D. Comer, *Internetworking with TCP/IP*—vol. 1: *Principles, Protocols, and Architecture*, Chapter 17, 3rd Edition, Prentice Hall, N.J., 1999, pp. 291-298.

U.S. Appl. No. 09/564,387, entitled Technique of Multidocument Internet Multicasting, filed May 3, 2000.

* cited by examiner

DISTRIBUTED MULTICAST CACHING TECHNIQUE

BACKGROUND OF THE INVENTION

1. Field of the Invention

This invention relates to multicast transmission of information across a data network. More particularly this invention relates to an improved caching technique for use in multicasting over a data network.

2. Description of the Related Art

The push model for distributing data over the Internet and other client server networks has become more widespread in recent years. In modern versions of this model a server "multicasts" data to an interested subset of clients on the network, known as a "multicast group". Whoever is interested becomes a listener by joining the group.

By their nature, push applications are closer to the broadcasting paradigm of radio and television than to the interactive paradigm of the World Wide Web. As such, broadband networks, such as cable TV or satellite, can be used as a very efficient medium for the transmission of "pushed data". Unfortunately, currently these networks are one-way only. That is to say, data such as a television program is sent from a broadcasting facility (the head-end) to several receivers (end-users) without any feedback. As such, these networks are inappropriate for popular interactive push applications since the latter require a return channel. Although attempts to upgrade the current public network infrastructure are underway in several places around the world, it will take some years until reliable two-way broadband networks are commonplace and therefore, a mechanism for multicasting over one-way broadband networks is desirable.

Caching systems have been developed to improve the efficiency of data transmission across the internet. Current internet caching systems, however, are based on the unicast TCP/IP transport protocol. Various technical issues have impeded the development of caching systems adapted to multicast transmission. Using the unicast transport protocol, a document is required to be delivered separately to each requesting client of the cache. For example, when two clients request the same documents simultaneously, or within a short interval, the cache transmitter is required to read the document twice, and send it twice. Consequently the resources of both the cache transmitter and the internet are used inefficiently.

The document, *Reliable Multicast Transport Protocol*, Shioshita, Teruji et al., Draft Document for the 37th IETF, Feb. 7, 1997, proposes a transport control mechanism to enable reliable multicast data transfer to a large number of receivers on a TCP/IP network from a server in parallel. This protocol promotes short delivery time, as the data is transferred only once, and conserves bandwidth because only one copy of the data is sent to the server. It has the advantage of requiring only a single session regardless of the number of receivers. However, despite some optimizations, there remains a requirement for receiver confirmation by ACK/NAK responses and the retransmission of data to selected receivers based on the information associated with the NAK response are disadvantages, as large numbers of receivers issuing ACK/NAK responses can still cause network congestion.

Another known multicast transport protocol is proposed in *Starburst Multicast File Transfer Protocol(MFTP) Specification*. Miller, K. et al., Internet Draft, April 1998. This protocol operates in the Application Layer.

In copending U.S. Pat. No. 6,507,586, of common assignee herewith, and hereby incorporated by reference, a technique of IP multicasting over existing broadband networks without using a return link is disclosed. This technique allows the issues of multicast group membership and error detection and recovery to be handled locally within an end-user terminal, without need for returning data to a host. According to the technique a single data transmitter sends a group of data items to a subset of possible receivers over a one-way channel. Each data item is divided into blocks which are encapsulated to form datagrams, each including a block sequence number, a data item identifier, and a timestamp indicating the age of the data item. A group directory is regularly sent by the transmitter to each of the possible receivers. The group directory contains information for all groups of data items, enabling each receiver to select the group of data item it wishes to receive. Reliability is provided by periodic retransmission of missing data. Despite these advantages, significant problems remain.

SUMMARY OF THE INVENTION

It is a primary advantage of some aspects of the present invention that there is improved caching of content that is multicast across a data network.

A caching arrangement for the content of multicast transmission across a data network utilizes a first cache, which receives content from one or more content providers. Using the REMADE protocol, the first cache constructs a group directory. The first cache forms the root of a multilevel hierarchical tree. In accordance with configuration parameters, the first cache transmits is the group directory to a plurality of subsidiary caches. The subsidiary caches may reorganize the group directory, and relay it to a lower level of subsidiary caches. The process is recursive, until a multicast group of end-user clients is reached. Requests for content by the end-user clients are received by the lowest level cache, and should the content not be available, the request is forwarded toward the root of the tree until it is found. The content is then returned to the requesters. Various levels of caches retain the group directory and content according to configuration options, which can be adaptive to changing conditions such as demand, loading, and the like. The behavior of the caches may optionally be modified by the policies of the content providers.

It is an advantage of some aspects of the invention that content need only be transmitted once to multiple receivers.

The invention provides a method of transmitting data over a communications network which includes receiving content from a content provider, and responsive to the content establishing a first group directory in a cache. The method includes transmitting the first group directory from the cache on a data channel to a subsidiary cache, establishing a second group directory in the subsidiary cache, in which the second group directory is derived from the first group directory, and transmitting the second group directory from the subsidiary cache to a multicast group of receivers.

According to an aspect of the invention, the first group directory is transmitted using the REMADE protocol.

According to still another aspect of the invention, the first group directory is transmitted periodically.

According to an additional aspect of the invention, the first group directory is transmitted in response to a request from a receiver.

According to another aspect of the invention, the first group directory is transmitted according to a policy of the content provider.

According to an aspect of the invention, the second group directory is transmitted periodically.

According to still another aspect of the invention, the second group directory is transmitted in response to a request from a receiver.

According to an aspect of the invention, the second group directory is transmitted using a REMADE protocol.

According to yet another aspect of the invention, the second group directory is transmitted according to a policy of the content provider.

According to a further aspect of the invention, the content provider is a plurality of content providers.

According to another aspect of the invention, the subsidiary cache is a plurality of subsidiary caches.

According to a further aspect of the invention, the cache and the subsidiary caches are linked together as a hierarchical tree, the cache forming a root of the hierarchical tree.

Still another aspect of the invention includes receiving a transmission request from a member of the group of receivers, wherein the transmission request is responsive to the second group directory, and responsive to the transmission request, transmitting a data item from the subsidiary cache to the receiver.

According to still another aspect of the invention, the first group directory includes a root directory hierarchically linked to a plurality of subdirectories. The subdirectories carry a list of data items. A subtree of the first group directory is defined by one of the subdirectories and at least one linked subdirectory thereunder.

According to yet another aspect of the invention, the second group directory includes a root directory hierarchically linked to a plurality of subdirectories. The subdirectories carry a list of data items. A subtree of the second group directory is defined by one of the subdirectories and at least one linked subdirectory thereunder.

The invention provides a computer software product, comprising a computer-readable medium in which computer program instructions are stored, which instructions, when read by at least one computer, causes the computer to execute a method of transmitting data over a communications network. The method includes receiving content in a first server from a content provider, and responsive to the content establishing a first group directory in a cache of the first server. The method further includes transmitting the first group directory from the cache on a data channel to a second server that has a subsidiary cache, establishing a second group directory in the subsidiary cache, wherein the second group directory is derived from the first group directory, and transmitting the second group directory from the subsidiary cache to a multicast group of receivers.

The invention provides a system for transmitting data over a communications network, which includes a first server, having a cache therein, The first server receives content from a content provider, and responsive to the content, establishes a first group directory in its cache, and transmits the first group directory to a second server having a subsidiary cache.

According to an aspect of the invention, the cache and the subsidiary caches are linked together as a hierarchical tree, the cache forming a root of the hierarchical tree.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Software programming code, which embodies the present invention, is typically stored in permanent storage of some type, such as a computer readable medium. In a client/server environment, such software programming code may be stored on the client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Figure 1:
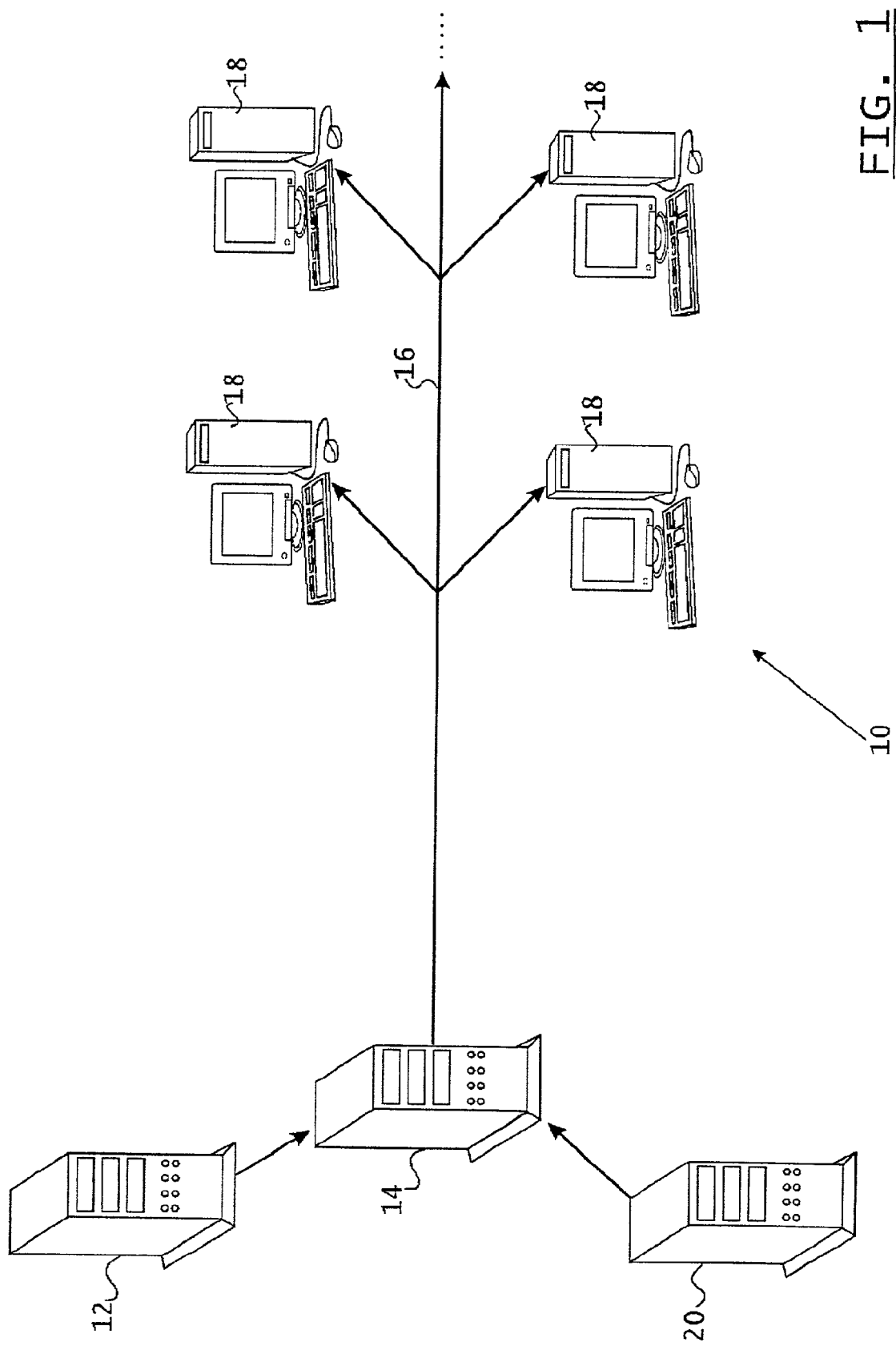
FIG. 1 is a schematic diagram of a multicasting cache arrangement.

Turning now to the drawings, and to FIG. 1 thereof, there is shown the high level architecture of a first embodiment of a multicasting system 10 which can be employed using the techniques of the present invention. The source of the files is a content provider 12, which is provided with transmitting capability, but may lack receiving capability. The content provider 12 is a parent with respect to a downstream cache 14. Content is multicast via a data network 16, which may be the Internet, to a plurality of end-user clients 18.

It is possible for the cache 14 to receive content from a plurality of content providers. For example both the content provider 12 and the content provider 20 may submit a catalog to the cache 14, which then combines information from the two catalogs to formulate its own catalog or group directory for subsequent multicast.

The cache 14 employs the REMADE protocol to multicast the content. The REMADE protocol is disclosed in the above noted U.S. Pat. No. 6,507,586. The REMADE protocol is a technique of IP multicasting over existing broadband networks without using a return link. This technique allows the issues of multicast group membership and error detection and recovery to be handled locally within an end-user terminal, without need for returning data to a host. According to the technique, a single data transmitter sends a group of data items to a subset of possible receivers. Each data item is divided into blocks, which are encapsulated to form datagrams, each including a block sequence number, a data item identifier, and a timestamp indicating the age of the data item. A catalog, comprising a group directory is regularly sent by the transmitter to each of the possible receivers.

The group directory contains information for all groups of data items, enabling each receiver to select the group of data item it wishes to receive. Reliability may be provided by periodic retransmission of missing data.

In some embodiments, improvements in the REMADE protocol which were disclosed in our copending application Ser. No. 09/564,387, filed May 3, 2000, and herein incorporated by reference, may be used in the practice of the present invention.

Figure 2:
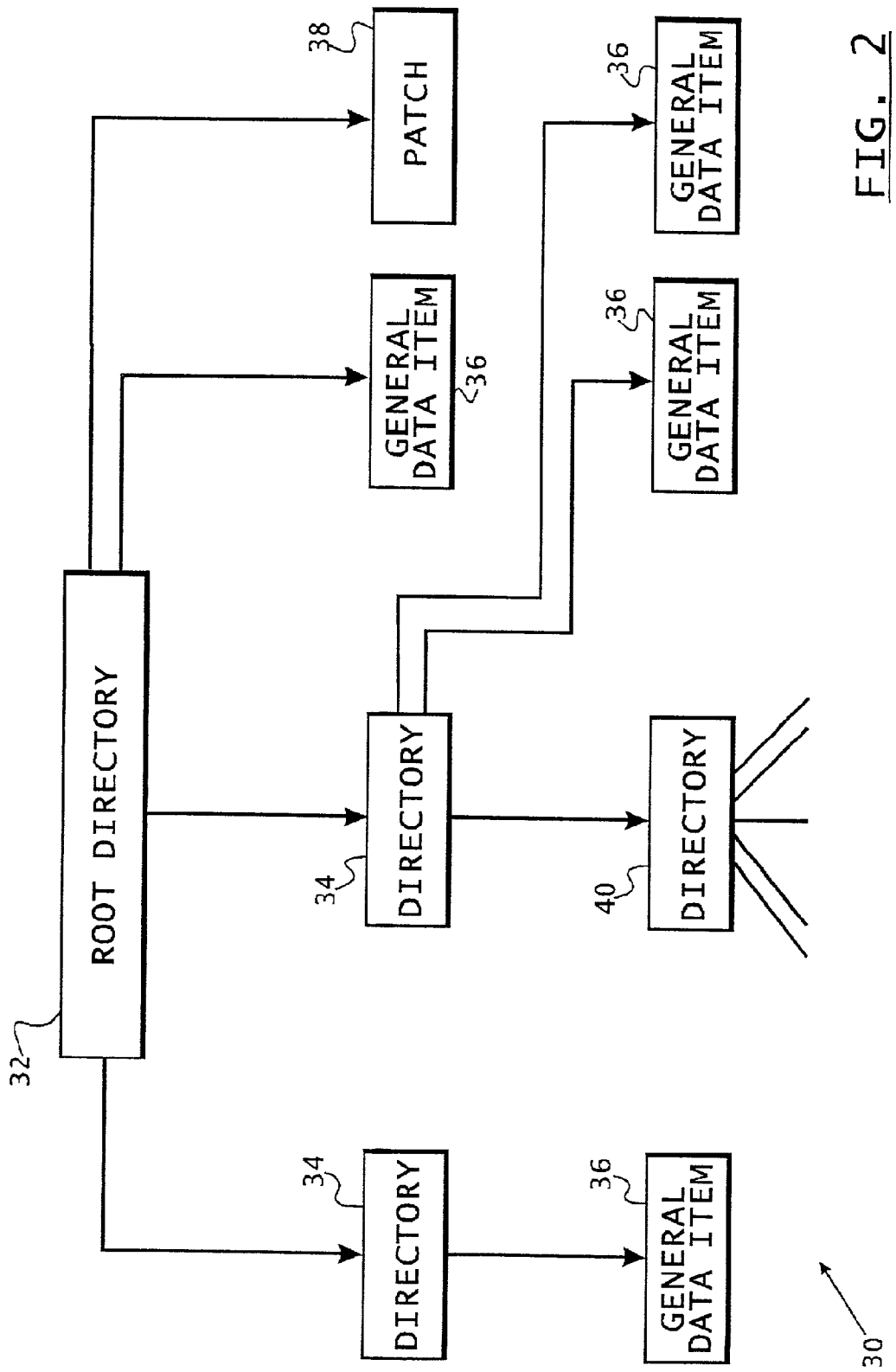
FIG. 2 is a block diagram of a group directory.

Referring now to FIG. 2, a representative group directory, directory system 30, is shown. The directory system 30 is a preferably a hierarchical arrangement, and comprises a root directory 32, with links to subdirectories 34. The root directory 32, and any of the subdirectories 34 may have links to general data items 36, or to patches 38. The arrangement is recursive, with subdirectories 34 having links to more deeply nested subdirectories, such as subdirectory 40. The directory system 30 may contain the following multicast group information: the group's multicast address; the group's assigned port; the range of data items in the group; the group's timestamp; and information (such as keywords) related to the group contents. Multicast receivers can check the directory regularly and use the information in it to select "interesting groups". Decisions as to whether to join or leave a group are made entirely within the receivers, i.e. the multicast transmitter is ignorant of group membership.

Referring again to FIG. 1, functionally the cache 14 operates according to a service policy that is appropriate for a particular application. Files may be retained or erased, in whole or in part, following a multicast, depending on various factors, which may include file size, the characteristics of the provider or the recipient, average demand for the content, currently available free space, and many other relevant parameters.

Figure 3:
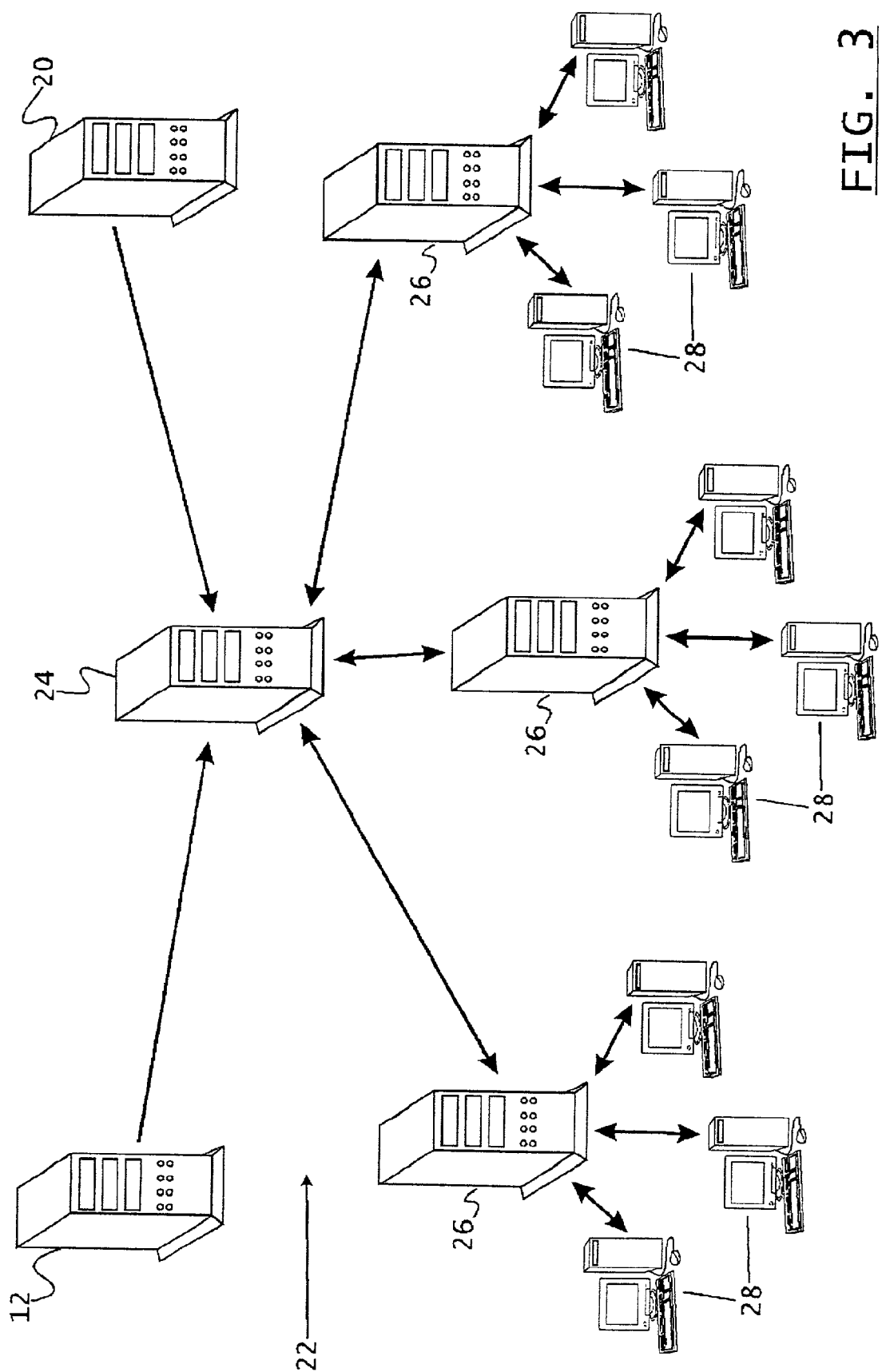
FIG. 3 is a schematic diagram of a multicasting cache arrangement in accordance with the invention that employs a hierarchical tree structure.

As shown in FIG. 3, a second embodiment of the invention employs a multilevel hierarchy 22 of cache servers. As in the first embodiment, a plurality of content providers 12, 20 provide content to a high level cache 24, The content providers 12, 20 have transmitting capability, but may lack receiving capability. In addition to providing content, the content providers 12, 20 optionally act as policy control servers, specifying the recipients to whom the content may be delivered, and the manner of delivery. In default of a content delivery policy received from either of the content providers 12, 20, the cache 24 executes an internal policy. In any case the interaction of the cache 24 and other levels of the multilevel hierarchy 22 is preferably determined by internal configuration options, rather than by the content providers 12, 20.

Upon request, or in accordance with its policy control, the cache 24 delivers catalog and content in accordance with the REMADE protocol over a data network, which may be the Internet, to subsidiary caches 26. The subsidiary caches 26 have both receiving and transmitting capabilities, and depending upon the attributes of their respective clients, may independently reorganize the catalog that was received from the cache 24. In FIG. 3, each of the subsidiary caches 26 has end-user clients 28. It should be noted that while the multilevel hierarchy 22 is represented for clarity in FIG. 3 as a two-level tree, comprising the cache 24 and the subsidiary caches 26, there can be any number of levels in the tree-structured hierarchy, as appropriate for a particular application. In such case, the subsidiary caches 26 communicate with a lower level of caches, rather than directly with the end-user clients 28.

Typically, the end-user clients 28 have both transmitting and receiving capability. When the subsidiary caches 26 have organized their data inventory into a tree-structured catalog according to the REMADE protocol, as disclosed more fully in the above noted U.S. Pat. No. 6,507,586, they transmit it to all the end-user clients 28, or to a predefined multicast group of the end-user clients 28. The end-user clients 28 receive a relevant part of the catalog, or may receive the whole catalog. They choose a document, and begin receiving it according to the REMADE protocol. Of course, various members end-user clients 28 may choose different documents, in which case all the documents are transmitted according to the governing policy. Clients not currently members of the multicast group may in some circumstances elect to join it. Based on considerations such as the average number of requests for particular content specified in the catalog, the subsidiary caches 26 can independently decide to elect a periodic mode of transmission of the catalog or the content, or to transmit either or both of them on demand. In like manner, the cache 24 can elect a mode of transmission of its catalog to the subsidiary caches 26.

In the multilevel hierarchy 22, should a particular one of the subsidiary caches 26 lack a file, or portion of a file, requested by a receiver, such as one or more of the end-user clients 28, it obtains the missing parts from the cache 24. These parts are immediately resent to the receiver, which considerably reduces latency from the point of view of the receiver.

In a downstream push mode of operation, if a particular content is designated according to the service policy as content in high demand, then the cache 14 may, even in the absence of a request from any of the end-user clients 18, multicast the content. In this mode, the content is flagged, requiring any downstream caches to begin receiving the content immediately, without waiting for transmission requests from clients. In the case of a multilevel cache hierarchy, the caches in each level may push the content down to other levels. As in the other modes of operation, the behavior of the caches at all levels is controlled by configuration parameters, optionally modified by the policies of higher level caches, or of the content providers 12, 20.

While this invention has been explained with reference to the structure disclosed herein, it is not confined to the details set forth and this application is intended to cover any modifications and changes as may come within the scope of the following claims:

What is claimed is:

1. A method of transmitting data over a communications network, comprising:
   receiving content from a content provider in a first cache;
      responsively to receipt of said content establishing a first group directory in said first cache;
      multicasting said first group directory from said first cache over said communications network to a plurality of subsidiary caches, while flagging said content so as to require said subsidiary caches to begin receiving said content immediately without waiting for transmission requests from clients, and without using a return link from the subsidiary caches to the first cache;
      establishing second group directories in said subsidiary caches, said second group directories being derived from said first group directory; and
      transmitting said second group directories from said subsidiary caches to a multicast group of receivers.

2. The method according to claim 1, wherein multicasting said first group directory comprises periodically retransmitting said first group directory, so as to enable said subsidiary caches to recover from errors in transmission without returning messages to said first cache.

3. The method according to claim 1, wherein said step of transmitting said first group directory is performed using a REMADE protocol, wherein said first group directory and said second group directories comprise data items that are divided into blocks that include a block sequence number, a data item identifier, and a timestamp indicating an age of a respective data item.

4. The method according to claim 1, wherein said step of transmitting said first group directory is performed by periodic transmission thereof.

5. The method according to claim 1, wherein said step of transmitting said first group directory is performed according to a policy of said content provider.

6. The method according to claim 1, wherein said step of transmitting said second group directory is performed by periodic transmission thereof.

7. The method according to claim 1, wherein said step of transmitting said second group directory is performed using a REMADE protocol, wherein said first group directory and said second group directories comprise data items that are divided into blocks that include a block sequence number, a data item identifier, and a timestamp indicating an age of a respective data item.

8. The method according to claim 1, wherein said step of transmitting said second group directories is performed according to a policy of said content provider.

9. The method according to claim 1, wherein said content provider comprises a plurality of content providers.

10. The method according to claim 1, wherein said first cache and said subsidiary caches are linked together as a hierarchical tree, said first cache forming a root of said hierarchical tree.

11. The method according to claim 1, wherein said first group directory comprises a root directory hierarchically linked to a plurality of subdirectories, said subdirectories carrying a list of data items, a subtree of said first group directory being defined by one of said subdirectories and at least one linked subdirectory thereunder.

12. The method according to claim 1, wherein said second group directories comprises a root directory hierarchically linked to a plurality of subdirectories, said subdirectories carrying a list of data items, a subtree of said second group directory being defined by one of said subdirectories and at least one linked subdirectory thereunder.

13. The method according to claim 1, wherein said step of transmitting said first group directory is performed without receiving communications from any receivers of said content.

14. A computer software product, comprising a computer-readable medium in which computer program instructions are stored, which instructions, when read by at least one computer, causes said at least one computer to execute a method of transmitting data over a communications network, comprising the steps of:
receiving content from a content provider in a first cache;
responsively to receipt of said content establishing a first group directory in said first cache;
multicasting said first group directory from said first cache over said communications network to a plurality of subsidiary caches, while flagging said content so as to require said subsidiary caches to begin receiving said content immediately without waiting for transmission requests from clients, and without using a return link from the subsidiary caches to the first cache;
establishing second group directories in said subsidiary caches, said second group directories being derived from said first group directory; and
transmitting said second group directories from said subsidiary caches to a multicast group of receivers.

15. The computer software product according to claim 14, wherein multicasting said first group directory comprises periodically retransmitting said first group directory, so as to enable said subsidiary caches to recover from errors in transmission without returning messages to said first cache.

16. The computer software product according to claim 14, wherein said step of transmitting said first group directory is performed using a REMADE protocol, wherein said first group directory and said second group directories comprise data items that are divided into blocks that include a block sequence number, a data item identifier, and a timestamp indicating an age of a respective data item.

17. The computer software product according to claim 14, wherein said step of transmitting said first group directory is performed by periodic transmission thereof.

18. The computer software product according to claim 14, wherein said step of transmitting said first group directory is performed according to a policy of said content provider.

19. The computer software product according to claim 14, wherein said step of transmitting said second group directories is performed by periodic transmission thereof.

20. The computer software product according to claim 14, wherein said step of transmitting said second group directory is performed using a REMADE protocol, wherein said first group directory and said second group directories comprise data items that are divided into blocks that include a block sequence number, a data item identifier, and a timestamp indicating an age of a respective data item.

21. The computer software product according to claim 14, wherein said step of transmitting said second group directories is performed according to a policy of said content provider.

22. The computer software product according to claim 14, wherein said content provider comprises a plurality of content providers.

23. The computer software product according to claim 14, wherein said cache and said subsidiary caches are linked together as a hierarchical tree, said cache forming a root of said hierarchical tree.

24. The computer software product according to claim 14, wherein said first group directory comprises a root directory hierarchically linked to a plurality of subdirectories, said subdirectories carrying a list of data items, a subtree of said first group directory being defined by one of said subdirectories and at least one linked subdirectory thereunder.

25. The computer software product according to claim 14, wherein said second group directories comprises a root directory hierarchically linked to a plurality of subdirectories, said subdirectories carrying a list of data items, a subtree of said second group directory being defined by one of said subdirectories and at least one linked subdirectory thereunder.

26. The computer software product according to claim 14, wherein said step of transmitting said first group directory is performed without receiving communications from any receivers of said content.

27. A system for transmitting data over a communications network, comprising:
a first server, having a cache therein, receiving content from a content provider, wherein responsive to said content a first group directory is established in said cache by said first server; and a plurality of second servers, having respective subsidiary caches therein, wherein said first server is arranged to multicast said first group directory from said first cache over said communications network to said subsidiary caches, while flagging said content so as to require said subsidiary caches to begin receiving said content immediately without waiting for transmission requests from clients, and without using a return link from the subsidiary caches to the first cache, and wherein responsive to said first group directory, second group directories are established in said subsidiary caches by said second servers, and said second group directories are transmitted by said second servers from said subsidiary caches to a multicast group of receivers.

28. The system according to claim 27, wherein said first server is arranged to periodically retransmit said first group directory, so as to enable said subsidiary caches to recover from errors in transmission without returning messages to said first cache.

29. The system according to claim 27, wherein said first group directory is transmitted using a REMADE protocol, wherein said first group directory and said second group directories comprise data items that are divided into blocks that include a block sequence number, a data item identifier, and a timestamp indicating an age of a respective data item.

30. The system according to claim 27, wherein said first group directory is transmitted periodically.

31. The system according to claim 27, wherein said first group directory is transmitted according to a policy of said content provider.

32. The system according to claim 27, wherein said second group directories are transmitted periodically.

33. The system according to claim 27, wherein said second group directory is transmitted using a REMADE protocol, wherein said first group directory and said second group directories comprise data items that are divided into blocks that include a block sequence number, a data item identifier, and a timestamp indicating an age of a respective data item.

34. The system according to claim 27, wherein said second group directories are transmitted according to a policy of said content provider.

35. The system according to claim 27, wherein said content provider comprises a plurality of content providers.

36. The system according to claim 27, wherein said cache and said subsidiary caches are linked together as a hierarchical tree, said cache forming a root of said hierarchical tree.

37. The system according to claim 27, wherein said first group directory comprises a root directory hierarchically linked to a plurality of subdirectories, said subdirectories carrying a list of data items, a subtree of said first group directory being defined by one of said subdirectories and at least one linked subdirectory thereunder.

38. The system according to claim 27, wherein said second group directories comprises a root directory hierarchically linked to a plurality of subdirectories, said subdirectories carrying a list of data items, a subtree of said second group directory being defined by one of said subdirectories and at least one linked subdirectory thereunder.

39. The system according to claim 27, wherein said first server is operative to transmit said first group directory to said subsidiary cache without receiving communications from any receivers of said content.

* * * * *